United States Patent [19]

Hattori et al.

[11] Patent Number: 5,116,885
[45] Date of Patent: May 26, 1992

[54] RESIN COMPOSITION

[75] Inventors: Eiji Hattori, Machida; Yasuo Oguri, Tokyo, both of Japan

[73] Assignee: Mitsubishi Kasei Corporation, Tokyo, Japan

[21] Appl. No.: 588,493

[22] Filed: Sep. 21, 1990

Related U.S. Application Data

[63] Continuation of Ser. No. 397,889, Aug. 24, 1989, abandoned.

[30] Foreign Application Priority Data

Sep. 9, 1988 [JP] Japan ................................. 63-225813
Apr. 19, 1989 [JP] Japan ..................................... 1-99847

[51] Int. Cl.$^5$ ................................................. C08K 7/18
[52] U.S. Cl. ..................................... 523/200; 523/210; 523/216; 523/220
[58] Field of Search ............... 523/200, 210, 216, 220; 524/493

[56] References Cited

U.S. PATENT DOCUMENTS

| | | | |
|---|---|---|---|
| 3,637,571 | 1/1972 | Polovina | 523/333 |
| 3,658,750 | 4/1972 | Tsukui et al. | 523/220 |
| 4,499,217 | 2/1985 | Yoshimura et al. | 523/333 |
| 4,701,479 | 10/1987 | Shiobara et al. | 523/220 |
| 4,711,916 | 12/1987 | Hagiwara et al. | 523/443 |
| 4,786,659 | 11/1988 | McKie et al. | 523/220 |

Primary Examiner—Joseph L. Schofer
Assistant Examiner—R. H. Delmendo
Attorney, Agent, or Firm—Oblon, Spivak, McClelland, Maier & Neustadt

[57] ABSTRACT

A resin composition having inorganic filler particles with an average particle size of from 0.05 to 150 μm incorporated in an amount of from 20 to 85% by volume based on the entire resin composition, wherein:

(a) said particles comprise at least two groups of particles differing in the average particle size, (b) particles constituting a group of particles with the smallest average particle size, are spherical particles with an average particle size smaller than 5 μm, (c) a group or groups of particles with an average particle size larger than the particles of (b), are constituted by spherical particles, pulverized particles or a mixture thereof, (d) as between two groups of particles with their average particle sizes being close to each other, the ratio of the minimum particle size within a range defined by the standard deviation of the particle size distribution of the group of particles with a large average particle size, to the maximum particle size within a range defined by the standard deviation of the particle size distribution of the group of particles with a small average particle size, is at least 2, and (e) the proportion of the volume of the group of particles with a large average particle size, to the total volume of the two groups of particles with their average particle sizes being close to each other, is from 20 to 95% by volume.

13 Claims, No Drawings

RESIN COMPOSITION

This application is a continuation of application Ser. No. 07/397,889, filed on Aug. 24, 1989, now abandoned.

The present invention relates to a resin composition having an inorganic filler incorporated therein. More particularly, it relates to a resin composition having a large content of an inorganic filler and yet having excellent moldability and flowability.

It is known to incorporate various fillers for the purpose of reinforcing a resin or improving the properties of a resin. Such fillers include organic and inorganic materials. As a material containing a relatively large amount of an inorganic filler, there may be mentioned a filler for dental use or a sealant for semiconductors or for various electronics parts.

For example, IC (integrated circuit) and LSI (large scale integration) are sealed with a sealant to protect the semiconductor elements from external impacts, moisture, heat and $\alpha$-rays. As such a sealant, ceramics or a resin is mainly employed. Sealing with a resin (plastic sealing) is advantageous in that it is inexpensive and excellent for mass production. Plastic sealing by low pressure transfer molding by means of an epoxy resin having excellent air tight sealing properties and heat resistance, is particularly preferred and most commonly employed.

However, in such plastic sealing, due to a stress caused by the difference in the thermal expansion coefficient between the silicon chip and the resin, aluminum wirings or bonding wires are likely to deform or break, or cracking of passivation and sealant is likely to take place to cause a change in the electrical properties of the integrated circuit or a deterioration of the moisture resistance. In order to reduce such a stress, it has been proposed to incorporate an inorganic filler to the resin to reduce the difference in the thermal expansion coefficient from the silicon chip. To reduce the difference in the thermal expansion coefficient by the addition of an inorganic filler to the resin, the larger the amount of the filler, the better. However, as the amount of the filler increases, the melt viscosity of the resin composition increases, and flowability decreases, thus adversely affecting the moldability.

Under the circumstances, it has been desired to develop a material having a large amount of a filler incorporated to reduce the difference in the thermal expansion coefficient and yet having excellent moldability. Such a demand increases as the trend for high integration or for large size semiconductor chips progresses.

Heretofore, for resin compositions for sealing semiconductors, it has been proposed to use spherical silica as an inorganic filler (Nikkei New Materials, Mar. 30, 1987, p. 32) or to use at least two types of silica differing in the particle size (e.g. Japanese Unexamined Patent Publication No. 34052/1986). However, neither one fully satisfies the above demand.

The present inventors have conducted extensive research with an aim to develop a resin composition having a inorganic filler incorporated, whereby a large amount of the filler may be incorporated and yet excellent moldability is attainable. It has now been found possible to accomplish this object by using as a filler at least two groups of inorganic filler particles differing in the average particle size, comprising a group of fine spherical particles with an average particle size of at most 5 $\mu$m and a group or groups of particles with larger particle sizes. Further, it has been found that the melt viscosity of the resin composition can further be improved by mixing the filler particles under certain specific conditions before incorporation.

The present invention provides a resin composition having inorganic filler particles with an average particle size of from 0.05 to 150 $\mu$m incorporated in an amount of from 20 to 85% by volume based on the entire resin composition, wherein:

(a) said particles comprise at least two groups of particles differing in the average particle size, (b) particles constituting a group of particles with the smallest average particle size, are spherical particles with an average particle size smaller than 5 $\mu$m, (c) a group or groups of particles with an average particle size larger than the particles of (b), are constituted by spherical particles, pulverized particles or a mixture thereof, (d) as between two groups of particles with their average particle sizes being close to each other, the ratio of the minimum particle size within a range defined by the standard deviation of the particle size distribution of the group of particles with a large average particle size, to the maximum particle size within a range defined by the standard deviation of the particle size distribution of the group of particles with a small average particle size, is at least 2, and (e) the proportion of the volume of the group of particles with a large average particle size, to the total volume of the two groups of particles with their average particle sizes being close to each other, is from 20 to 95% by volume.

The present invention is concerned also with a composition obtained by dispersing and mixing in a polar organic liquid the particles as defined by the above (a) to (e) and then incorporating them to a resin.

Now, the present invention will be described in detail with reference to the preferred embodiments.

The resin used in the resin composition of the present invention may be a thermoplastic resin or a curable resin which may be cured by heat, light or microwaves or by a chemical reaction, such as a thermosetting resin or a photocurable resin. As the curable resin, an epoxy resin, a bismaleimide resin, a urea resin or an acrylate resin may be mentioned. Such a curable resin may contain a curing accelerator such as a photosensitizer, a reaction accelerator or a catalyst, or a pigment, a releasing agent, a flexibility-imparting agent or other additives. As the thermoplastic resin, a polyolefin such as polyethylene or polypropylene, a polystyrene, a polyamide, a polyethylene terephthalate, a polybutylene terephthalate, a polyacetal, a polycarbonate, a polyallylate, a polysulfone, a polyethersulfone, a polyether ether ketone, a liquid crystalline polyester, a polyphenylene sulfide, a polyamideimide, a polyimide, a polyetherimide or a polymethyl methacrylate, may be mentioned. However, the useful thermoplastic resin is not restricted to such specific examples. Further, it may contain a pigment or other additives.

These resins may be used alone or in combination as a blend or a complex obtained by alloying two or more different kinds.

The inorganic filler particles to be used in the present invention include spherical particles and pulverized particles of e.g. silica, alumina, titania, zirconia, titanium silicate, aluminum silicate, lithium.aluminum silicate, magnesium.aluminum silicate, aluminum titanate, aluminum nitride and silicon nitride. However, the useful inorganic filler particles are not restricted to such specific examples. Further, two or more different types of fillers may be used in combination.

The resin and the filler are suitably selected depending upon the particular purpose of use and the desired properties. For example, for the purpose of a sealant for semiconductors, it is usual to employ an epoxy resin. Various known epoxy resins may be used. To the resin, various additives such as a curing agent, a curing accelerator, a pigment, a releasing agent or a flexibility-imparting agent may be incorporated.

The inorganic filler is incorporated for the purpose of reducing the thermal expansion coefficient of the resin. Therefore, it is preferably the one having a low thermal expansion coefficient itself. In this respect, silica is most preferred. Further, the inorganic filler is required to be of high purity without substantially containing impure elements such as chlorine, uranium or thorium, in order to prevent corrosion of aluminum wirings or software malfunction.

For the resin composition of the present invention, the inorganic filler particles with an average particle size within a range of from 0.05 to 150 μm are employed. If the average particle size is smaller than 0.05 μm, the specific surface area of the particles tends to be large, whereby coagulation is likely to result, and it tends to be difficult to obtain a resin composition having particles incorporated at a high density. On the other hand, if particles with an average particle size exceeding 150 μm are employed, when particles with a different particle size are mixed thereto and then the mixture is kneaded with a resin, followed by melt molding, such particles tend to be separated from the particles having the different particle size, whereby uniform mixing and uniform molding tend to be difficult.

The inorganic filler to be used in the present invention is required to satisfy the following conditions:

(a) the inorganic filler particles comprise at least two groups of particles differing in the average particle size;

(b) among such groups of particles, particles constituting a group of particles with the smallest average particle size are spherical particles with an average particle size smaller than 5 μm, preferably at most 2 μm, more preferably at most 1.0 μm;

(c) a group or groups of particles with an average particle size larger than the particles of (b) are constituted by spherical particles and/or pulverized particles;

(d) as between two groups of particles with their average particle sizes being close to each other, the ratio of the minimum particle size within a range defined by the standard deviation of the particle size distribution of the group of particles with a large average particle size, to the maximum particle size within a range defined by the standard deviation of the particle size distribution of the group of particles with a small average particle size, is at least 2, preferably at least 5; and (e) the proportion of the volume of the group of particles with a large average particle size, to the total volume of the two groups of particles with their average particle sizes being close to each other, is from 20 to 95% by volume, more preferably from 50 to 90% by volume.

These conditions (a), (b), (c), (d) and (e) will be described in further detail.

The number of groups of particles differing in the average particle size is suitably selected taking into consideration the particle size distributions of the respective groups of particles or the particle size ratio among the groups of the particles.

The particles with an average particle size within a range of from 0.05 to 150 μm as specified in the present invention, may theoretically contain up to twelve groups of particles when the particle size ratio as between the two close groups of particles as specified in (d) is 2 and the particles of each group are assumed to have a uniform particle size (i.e. no particle size distribution). However, when each group of particles has a particle size distribution, for example, when the standard deviation ($\sigma$) of the particle size distribution is 1.2, the particles as specified in the present invention may theoretically contain up to 8 groups of particles.

When the standard deviation ($\sigma$) of the particle size distribution is 1.2 and the particle size ratio is as specified in (d) is 5, the particles of the present invention may theoretically contain up to 4 groups of particles.

(b) The spherical particles with an average particle size smaller than 5 μm as the group of particles with the smallest average particle size, are believed to be present in the spaces among particles of other larger particle sizes to increase the content of the filler and to serve as a lubricant to increase the slippage of the larger particles in the resin composition. However, if the average particle size of spherical particles exceeds 5 μm, they tend to hardly enter into the spaces among large particles.

(c) As the group of particles with an average particle size larger than the particles of (b), spherical particles and pulverized particles may be used alone independently or in combination as a mixture. When it is desired to increase the filler content or the flowability of the resin composition, it is preferred to employ spherical particles. From the viewpoint of the costs, it is advantageous to use pulverized particles. Both types of particles may be used in combination. The blend ratio of the spherical particles and the pulverized particles may suitably be determined taking into consideration the properties and the cost of the resin composition.

(d) As between two groups of particles with their average particle sizes being close to each other, if the ratio of the minimum particle size within a range defined by the standard deviation of the particle size distribution of the group of particles with a large average particle size, to the maximum particle size within a range defined by the standard deviation of the particle size distribution of the group of particles with a small average particle size, is less than 2, small particles tend to hardly enter into spaces among large particles, such being undesirable.

(e) If the proportion of the volume of the group of particles with a large average particle size, to the total volume of the two groups of particles with their average particle sizes being close to each other, is less than 20% by volume, the filler content tends to be small in such a state that large particles are scattered in the small particles. On the other hand, if the volume of the group of particles with a large average particle size exceeds 95% by volume, the filler content tends to be small, since the proportion by volume of small particles filling the spaces among large particles tends to be small relative to the increase of the spaces among large particles.

In general, the particle size distribution of each group of particles is preferably narrow. For example, the standard deviation is preferably at most 2, more preferably at most 1.5, and most preferably at most 1.2. However, in the actual situation, it is unnecessary to closely follow such standard deviation.

Namely, when the particle size ratio as defined in (d) is considerably large i.e. when there is a substantial difference in the particle size between the major portions of the two groups of particles, small particles can adequately be packed in spaces among large particles even if the particle size distributions of the respective groups of particles are relatively broad, and no problem of void spaces will thereby be brought about. Accordingly, the particle distributions of the respective groups of particles may be selected suitably depending upon the particular case taking into consideration the particle size ratio as defined in (d).

When the inorganic filler satisfying the above conditions for the shapes of the particles, for the average particle sizes, for the particle size distributions, for the ratios of the average particle sizes of particles and for the proportions of the volumes of the groups of particles, is kneaded with a resin and other additives, particles with small average particle sizes will effectively be packed in spaces among particles with relatively large average particle sizes, whereby it is possible to increase the inorganic filler incorporated to the total resin composition while maintaining a high level of flowability.

In the resin composition of the present invention, the filler may be incorporated up to 85% by volume of the resin composition.

Even when the amount of the filler is small, it is possible to obtain a composition with the melt viscosity reduced over the resin composition containing the same amount of the filler obtained by the conventional method.

The incorporated amount is calculated by the following formula I:

$$\text{Incorporated amount } (\%) = \frac{W\text{-particles}/\rho\text{-particles}}{W\text{-particles}/\rho\text{-particles} + W\text{-resin}/\rho\text{-resin}} \times 100 \quad (I)$$

$\rho$-particles: density (g/cm$^3$) of the filler

W-resin: weight (g) of the incorporated filler (including additives)

$\rho$-resin: density (g/cm$^3$) of the resin (including additives

For blending the inorganic filler to the resin, the inorganic filler and the resin, if necessary together with additives such as a curing agent or a pigment, are sufficiently uniformly mixed by e.g. a mixer, and melt-mixed by means of e.g. heat rolls, or kneaded by means of e.g. a kneader, followed by cooling for solidification to obtain a resin composition.

However, when particles of at least two groups of particles differing the average particle size, containing fine particles with an average particle size smaller than 5 μm, are to be added and mixed with the resin as mentioned above under a dry condition, it is extremely difficult to attain uniform mixing, since the dispersion of the particles, particularly the dispersion of the fine particles, in the resin, can not adequately be conducted. Further, even when it is attempted to mix particles of at least two groups of particles containing such fine particles in a dry system, fine particles are likely to coagulate under such dry condition, and the particles can not be mixed uniformly. Further, a wet system mixing in a solvent such as benzene or toluene was attempted, but it was impossible to obtain a uniform mixing. Even if such a non-uniform mixture is incorporated to the resin, the dispersion and mixing of the particles in the resin will be inadequate, whereby the above-mentioned high packing of the particles or the effect for the flowability of the particles will hardly be attained.

Under these circumstances, the present inventors have succeeded in preparing a resin composition having a filler containing fine particles uniformly dispersed therein, by dispersing and mixing in a polar liquid the groups of inorganic particles, followed by incorporation to the resin. As such a polar, liquid, water, an alcohol such as methanol, ethanol or isopropanol, a glycol such as ethylene glycol or propylene glycol, dimethylformamide, or dimethylsulfoxide may, for example be used. The polar liquid is not restricted to such specific examples, and any polar liquid may be used so long as it is capable of dispersing the filler particles under a stabilized condition. Depending upon the particular purpose of the resulting resin composition, the polar solvent may sometimes be restricted. For example, when the resin composition is intended as a sealant for semiconductors, a halogen-containing polar liquid is undesirable.

The amount of the polar liquid may be at any level so long as the filler particles can thereby be adequately dispersed. It is used usually in such an amount that the volume% of the filler particles to the sum of the filler particles and the polar liquid is from 5 to 85%, preferably from 10 to 60%.

A usual dispersing or mixing means such as a ball mill or a supersonic dispersing machine may suitably be used for dispersing and mixing the filler particles in the polar liquid.

For the dispersion and mixing of at least two groups of particles, the respective groups of particles may independently be thoroughly dispersed in the polar liquid, and the dispersions of the respective groups of particles in a slurry state may then be mixed, or all of said at least two groups of particles may be added to a polar liquid, followed by dispersing and mixing.

The filler particles dispersed and mixed in the polar liquid are usually subjected to the removal of the polar liquid and dried, and then incorporated to the resin as described above.

When the resin can be dissolved in the polar liquid used for dispersing and mixing the filler particles, the resin may be dissolved in the slurry of the polar liquid having the filler particles dispersed and mixed therein, followed by adequate mixing and then by evaporation and removal of the polar liquid to obtain a resin composition.

In either case, a care is required to prevent separation of the particles (the separation is likely due to the difference in the sedimentation attributable to the difference in the particle size) or to prevent the separation between the resin and the particles, for example, by stirring, when the polar solvent is removed.

According to the present invention, it is possible to increase the content of the inorganic filler without bringing about a reduction of the flowability. Therefore, according to the present invention, it is possible to obtain a resin composition which has a high inorganic filler content and accordingly a small heat expansion coefficient, excellent heat resistance and yet has high flowability and excellent moldability. Such a resin composition is suitable for various applications including an application as a sealant for semiconductors or as a filler for dental use.

For example, when the resin composition obtained in accordance with the present invention is used as a sealant for semiconductors, it is most common to use an epoxy resin as the resin and silica as the filler, as mentioned above. It is also possible to use, as the resin, an imide resin, an acrylate resin, a liquid crystal polyester, a polyphenylene sulfide, a polyether ether ketone or a polyamide, and as the filler, alumina, titanium silicate, aluminum silicate or aluminum nitride.

As a method for sealing a semiconductor element by using the resin composition having a filler incorporated therein, low pressure transfer molding, injection molding, compression molding and casting, may be mentioned. Among them, the low pressure transfer molding is most common. In the low transfer molding, the resin composition is firstly heated in a pot for plastization and then transferred under a low pressure (at a level of not higher than 70 kg/cm$^2$) into a mold, followed by curing and molding. The flowability of the molding material when heated for plastization substantially affects the moldability. The flowability can be evaluated, for example, by the content of particles which can be slurried and by measuring the viscosity by a flow tester, as a simple conventional method.

Now, the present invention will be described in further detail with reference to Examples. However, it should be understood that the present invention is by no means restricted by such specific Examples.

In the following examples, silica was used as the inorganic filler, and a mixture of the resin and additives as identified in the following (1) was used as the resin. The blend proportion (% by volume) of the filler was calculated in accordance with (2). The melt viscosity was measured in accordance with (3).

(1) The resin mixture was prepared by mixing the following resin and additives, in which "parts" means "parts by weight".

| Resin: | |
|---|---|
| Cresol novolak epoxy resin | 100 parts |
| Phenol novolak type curing agent | 50 parts |
| Modifier: Epoxy silane coupling agent | 2 parts |
| Releasing agent: Carnauba wax | 2 parts |
| Pigment: Carbon black | 1 part |

(2) Blend proportion (% by volume) of the filler

The blend proportion was calculated in accordance with the foregoing formula I by applying the density $\rho$-resin of the mixture of the resin and additives of the above (1) being 1.1 (g/cm$^3$) and the density $\rho$-silica being 2.2 (g/cm$^3$).

(3) Measurement of the melt viscosity

The mixture of the resin and additives of the above (1) and silica as the filler, were kneaded at 80° C. for 15 minutes by heat rolls. The viscosity of the composition thus obtained was measured by a flow tester. The flow tester had an orifice of 2 mm in diameter×5 mm in length, and the measurement was conducted under a pressure of 10 kg/cm$^2$ at a temperature of 175° C.

EXAMPLE 1

90 g of monodisperse spherical silica particles with an average particle size of 0.9 μm and a standard deviation ($\sigma$) of 1.05 were added to 215 g of ethanol (volume ratio of silica/ethanol=13/87) and dispersed for 24 hours by a ball mill. To the resulting slurry, 510 g of pulverized silica particles with an average particle size of 21 μm and a standard deviation ($\sigma$) of 1.4 were added to obtain a slurry (volume ratio of silica/ethanol=50/50). Then, the slurry was heated to 70° C. under stirring and mixing by means of a turbine vane type stirrer, whereby ethanol was removed by evaporation to obtain 600 g of preliminarily dispersed and mixed dry particles. 600 g of the particles were added to 200 g of the resin mixture (1) to obtain the proportions as identified in Table 1, and the mixture was kneaded, whereupon the melt viscosity of the composition thereby obtained was measured.

EXAMPLE 2

90 g of monodisperse spherical silica particles with an average particle size of 0.9 μm and a standard deviation ($\sigma$) of 1.05 and 510 g of pulverized silica particles with an average particle size of 21 μm and a standard deviation ($\sigma$) were added to 200 g of the resin mixture (1) without being preliminarily dispersed or mixed in a polar liquid, and the mixture was kneaded, whereupon the melt viscosity was measured.

COMPARATIVE EXAMPLE 1

600 g of pulverized silica particles with an average particle size of 21 μm and a standard deviation($\sigma$) of 1.4) were added to 200 g of the resin mixture (1) without being preliminarily treated, and the mixture was kneaded, whereupon the melt viscosity was measured.

EXAMPLE 3

100 g of monodisperse spherical silica particles with an average particle size of 0.9 μm and a standard deviation ($\sigma$) of 1.05 were added to 295 g of water (volume ratio of silica/ethanol=13/87) and dispersed for 24 hours by a ball mill. To the slurry thereby obtained, 550 g of pulverized silica particles with an average particle size of 21 μm and a standard deviation ($\sigma$) of 1.4 were added to obtain a slurry (volume ratio of silica/water=50/50). The slurry was heated to 100° C. under stirring and mixing by means of a turbine vane type stirrer, whereby water was removed by evaporation to obtain 650 g of preliminarily dispersed and mixed dry particles. The particles were added as the inorganic filler to 175 g of the resin mixture (1), and the mixture was kneaded, whereupon the melt viscosity of the composition thereby obtained was measured.

COMPARATIVE EXAMPLE 2

650 g of pulverized silica particles with an average particle size of 21 μm and a standard deviation ($\sigma$) of 1.4) were added to 175 g of the resin mixture (1) without being preliminarily treated, and the mixture was kneaded, whereupon the melt viscosity of the composition thereby obtained was measured.

COMPARATIVE EXAMPLE 3

The same silica particles as used in Example 3 were used in the same ratio (total of 650 g), and they were added to 175 g of the resin mixture (1) without being preliminarily treated. The mixture was kneaded, whereupon the melt viscosity of the composition thereby obtained was measured.

COMPARATIVE EXAMPLE 4

100 g of monodisperse spherical silica particles with an average particle size of 0.9 μm and a standard deviation ($\sigma$) of 1.05 were added to 231 g of cyclohexane (volume ratio of silica/ethanol=13/87), and it was attempted to disperse the mixture by a ball mill, but the obtained mixture was gel-like. To the gel-like mixture, 550 g of pulverized silica particles with an average particle size of 21 μm and a standard deviation (σ) of 1.4 were added to obtain a slurry (volume ratio of silica/cyclohexane=50/50), whereby a uniform slurry was not obtained with the powder scarcely wetted, and no adequate stirring and mixing were possible. The mixture was heated to 70° C., whereby cyclohexane was removed by evaporation to obtain 650 g of dry particles. The particles were added to 175 g of the resin mixture (1), and the mixture was kneaded, whereupon the melt viscosity was measured.

COMPARATIVE EXAMPLE 5

100 g of monodisperse spherical silica particles with an average particle size of 0.9 μm and a standard deviation (σ) of 1.05 were added to 260 g of benzene (volume ratio of silica/ethanol=13/87), and it was attempted to disperse the mixture in a ball mill, but the mixture became gel-like. To the gel-like mixture, 550 g of pulverized silica particles with an average particle size of 21 μm and a standard deviation (σ)=1.4 were added (volume ratio of silica/benezene=50/50), whereby a uniform slurry was not obtained with the powder scarcely wetted, and no adequate stirring and mixing were possible. The mixture was heated to 70° C., whereby benzene was removed by evaporation to obtain 650 g of dry particles. The particles were added to 175 g of the resin mixture (1), and the mixture was kneaded, whereupon the melt viscosity was measured.

COMPARATIVE EXAMPLE 6

100 g of monodisperse spherical silica particles with an average particle size of 0.9 μm and a standard deviation (σ) of 1.05 were added to 260 g of toluene (volume ratio of silica/ethanol=13/87), and it was attempted to disperse the mixture in a ball mill, but the mixture became gel-like. To the gel-like mixture, 550 g of pulverized silica particles with an average particle size of 21 μm and a standard deviation (σ) of 1.4 (volume ratio of silica/toluene=50/50), whereby a uniform slurry was not obtained with the powder scarcely wetted, and no adequate stirring and mixing were possible. The mixture was heated to 100° C., whereby toluene was removed by evaporation to obtain 650 g of dry particles. The particles were added to 175 g of the resin mixture (1), and the mixture was kneaded, whereupon the melt viscosity was measured.

EXAMPLE 4

80 g of monodisperse spherical silica particles with an average particle size of 0.5 μm and a standard deviation (σ) of 1.05 and 590 g of spherical silica particles with an average particle size of 22 μm and standard deviation (σ) of 1.04 were preliminarily dispersed and mixed in ethanol in the same manner as in Example 1, and then ethanol was distilled off to obtain 670 g of dry particles. The particles were added to 165 g of the resin mixture (1), and the mixture was kneaded. The melt viscosity of the composition thereby obtained was measured.

EXAMPLE 5

130 g of monodisperse spherical silica particles with an average particle size of 0.5 μm and a standard deviation (σ) of 1.05 and 560 g of spherical silica particles with an average particle size of 22 μm and standard deviation (σ) of 1.4 were preliminarily dispersed and mixed in ethanol in the same manner as in Example 4, and then ethanol was distilled off to obtain 690 g of dry particles. The particles were added to 155 g of the resin mixture (1), and the mixture was kneaded. The melt viscosity of the composition thereby obtained was measured.

COMPARATIVE EXAMPLE 7

Spherical silica particles with an average particle size of 22 μm and a standard deviation of (σ) of 1.4 was added to the resin mixture (1) to obtain the proportions as identified in Table 1 without being preliminarily treated with ethanol, and the mixture was kneaded. The melt viscosity of the composition thereby obtained was measured.

EXAMPLE 6

80 g of monodisperse spherical silica particles with an average particle size of 0.5 μm and a standard deviation (σ) of 1.05 were added to 274 g of methanol (volume ratio of silica/methanol=10/90) and dispersed for 24 hours by a ball mill. To the slurry thereby obtained, 190 g of spherical silica particles with an average particle size of 7 μm and a standard deviation (σ) of 1.2 and 490 g of spherical silica particles with an average particle size of 26 μm and a standard deviation (σ) of 1.2 were added to obtain a slurry (volume ratio of silica/methanol=50/50). The slurry was heated to 60° C. under stirring and mixing by means of a turbine vane type stirrer, whereby methanol was removed by evaporation to obtain 760 g of preliminarily dispersed and mixed dry particles. The particles were added to 120 g of the resin mixture (1) to obtain the proportions as identified in Table 1, and the mixture was kneaded, whereupon the melt viscosity was measured.

EXAMPLE 7

60 g of monodisperse spherical silica particles with an average particle size of 0.9 μm and a standard deviation (σ) of 1.05 were added to 215 g of ethanol (volume ratio of silica/ethanol=9/91) and dispersed for 24 hours by a ball mill. To the slurry thereby obtained, 150 g of spherical silica particles with an average particle size of 26 μm and a standard deviation (σ) of 1.2 and 390 g of pulverized silica particles with an average particle size of 138 μm and a standard deviation (σ) of 1.4 were added to obtain a slurry (volume ratio of silica/ethanol=50/50). Then, the slurry was heated to 70° C. under stirring and mixing by means of a turbine vane type stirrer, whereby ethanol was removed by evaporation to obtain 600 g of preliminarily dispersed and mixed dry particles. The particles were added to 200 g of the resin mixture (1), and the mixture was kneaded, whereupon the melt viscosity was measured.

COMPARATIVE EXAMPLE 8

The spherical silica particles with an average particle size of 26 μm and a standard deviation (σ) of 1.2 and the pulverized silica particles with an average particle size of 138 μm and a standard deviation (σ) of 1.4 were added to the resin mixture (1) to obtain the proportions as identified in Table 1 without being preliminarily treated with ethanol, and the mixture was kneaded. The melt viscosity of the composition thereby obtained was measured.

TABLE 1

| Shape of silica (average particle size) | Pulverized (138 μm) | Pulverized (21 μm) | Spherical (26 μm) | Spherical (22 μm) | Spherical (7 μm) | Spherical (0.9 μm) | Spherical (0.5 μm) | Total volume of all particles | Liquid for dispersing silica | Melt viscosity of the resin composition (Flow tester) (Poise) |
|---|---|---|---|---|---|---|---|---|---|---|
| Example 1 | | 51 | | | | 9 | | 60 | Ethanol | 79.2 |
| Example 2 | | 51 | | | | 9 | | 60 | — | 99.6 |
| Comparative Example 1 | | 60 | | | | | | 60 | — | 110.3 |
| Example 3 | | 55 | | | | 10 | | 65 | Water | 151.8 |
| Comparative Example 2 | | 65 | | | | | | 65 | — | Not measurable* |
| Comparative Example 3 | | 55 | | | | 10 | | 65 | — | Not measurable* |
| Comparative Example 4 | | 55 | | | | 10 | | 65 | Cyclo- | Not measurable* |
| Comparative Example 5 | | 55 | | | | 10 | | 65 | Benzene | Not measurable* |
| Comparative Example 6 | | 55 | | | | 10 | | 65 | Toluene | Not measurable* |
| Example 4 | | | | 59 | | | 8 | 67 | Ethanol | 70.7 |
| Example 5 | | | | 56 | | | 13 | 69 | Ethanol | 70.0 |
| Comparative Example 7 | | | | 61 | | | | 61 | — | Not measurable* |
| Example 6 | | | 49 | | 19 | | 8 | 76 | Methanol | 92.1 |
| Example 7 | 39 | 15 | | | | 6 | | 60 | Ethanol | 193.4 |
| Comparative Example 8 | 43 | 17 | | | | | | 60 | — | Not measurable* |

*The composition does not pass through the orifice.

It is evident from Table 1 that with respect to the resin containing 60% by volume of the filler, the composition of Comparative Example 1 wherein the filler was composed solely of pulverized particles, had a melt viscosity of 110.3, whereas the composition of Example 2 wherein a part of such particles was substituted by spherical fine particles (average particle size: 0.9 μm), had a melt viscosity as low as 99.6. Further, the composition of Example 1 wherein the same two groups of particles were used in the same composition and preliminarily treated with ethanol, had a still lower melt viscosity of 79.2, thus indicating improved flowability. Also with respect to the composition containing 65% by volume of the filler, the composition of Example 3 wherein two groups of particles i.e. spherical fine particles and pulverized particles, were used and preliminarily treated with water, had a melt viscosity of 151.8, whereas the composition of Comparative Example 2 wherein only one type of silica particles was used and the compositions of Comparative Example 3 to 6 wherein two groups of silica particles were employed, but no pretreatment was conducted, or treatment was conducted with a non-polar solvent, did not pass through the orifice, and it was impossible to measure the melt viscosity.

What is claimed is:

1. A resin composition having inorganic filler particles with an average particle size of from 0.05 to 150 μm incorporated in an amount of from 20 to 85% by volume based on the entire resin composition, wherein:
   (a) said particles comprise from two to twelve groups of particles differing the average particle size,
   (b) particles constituting a group of particles with the smallest average particle size, are spherical particles with an average particle size smaller than 5 μm, and with the standard deviation of the particle size distribution being at most 1.2,
   (c) a group or groups of particles with an average particle size larger than the particles of (b), are constituted by spherical particles, pulverized particles or a mixture thereof,
   (d) as between two groups of particles with their average particle sizes being close to each other, the ratio of the minimum particle size within a range defined by the standard deviation of the particle size distribution of the group of particles with a large average particle size, to the maximum particle size within a range defined by the standard deviation of the particle size distribution of the group of particles with a small average particle size, is at least 2, and
   (e) the proportion of the volume of the group of particles with a large average particle size, to the total volume of the two groups of particles with their average particles sizes being close to each other, is from 20% to 95% by volume, and
   wherein said inorganic filler particles are first dispersed in a polar liquid, and then, the filler particles, from which said polar liquid is removed, are incorporated into said resin.

2. The composition according to claim 1, wherein the polar liquid is at least one member selected from the group consisting of water, an alcohol, dimethylsulfoxide and dimethylformamide.

3. The composition according to claim 1, wherein the polar liquid is methyl alcohol or ethyl alcohol.

4. The composition according to claim 1, wherein the polar liquid is water.

5. The composition according to claim 1, wherein the resin is an epoxy resin, and the inorganic filler is silica preliminarily treated with an alcohol.

6. The composition according to claim 1, wherein the particles constituting a group of particles with the smallest average particle size, are spherical particles with an average particle size of at most 2.0 μm.

7. The composition according to claim 1, wherein the particles constituting a group of particles with the smallest average particle size, are spherical particles with an average particle size of at most 1.0 μm.

8. The composition according to claim 1, wherein as between the two groups of particles with their average particle sizes being close to each other, the ratio of the minimum particle size within a range defined by the standard deviation of the particle size distribution of the group of particles with a large average particle size, to the maximum particle size within a range defined by the standard deviation of the particle size distribution of the group of particles with a small average particle size, is at least 5.

9. The composition according to claim 1, wherein the inorganic filler is at least one member selected from the group consisting of silica, titania, alumina, zirconia, titanium silicate, aluminum silicate and aluminum nitride.

10. The composition according to claim 1, wherein the inorganic filler is silica.

11. The composition according to claim 1, wherein the resin is at least one member selected from the group consisting of an epoxy resin, an imide resin, an acrylate resin, a liquid crystal polyester resin, a polyphenylene sulfide, a polyether ether ketone, and a polyamide.

12. The composition according to claim 1, wherein the resin is an epoxy resin.

13. A process for preparing a resin composition having a large content of an inorganic filler and yet having a low viscosity, which comprises dispersing and mixing in a polar liquid an, inorganic filler consisting essentially of inorganic particles having an average particle size of from 0.05 to 150 μm, wherein:
  (a) said particles comprise from two to twelve groups of particles differing in the average particle size,
  (b) particles constituting a group of particles with the smallest average particle size, are spherical particles with an average particle size smaller than 5 μm and with the standard deviation of the particle size distribution being at most 1.2,
  (c) a group or groups of particles with an average particle size larger than the particles of (b), are constituted by spherical particles, pulverized particles or a mixture thereof,
  (d) as between two groups of particles with their average particle sizes being close to each other, the ratio of the minimum particle size within a range defined by the standard deviation of the particle size distribution of the group of particles with a large average particle size, to the maximum particle size within a range defined by the standard deviation of the particle size distribution of the group of particles with a small average particle size, is at least 2, and
  (e) the proportion of the volume of the group of particles with a large average particle size, to the total volume of the two groups of particles with their average particle sizes being close to each other, is from 20 to 95% by volume, and then, after the removal of the polar liquid, incorporating the filler to a resin in an amount of from 20 to 85% by volume based on the entire resin composition.

* * * * *